(12) United States Patent
Kusters et al.

(10) Patent No.: US 10,387,200 B2
(45) Date of Patent: Aug. 20, 2019

(54) BURST THROTTLING FOR MULTI-TENANT STORAGE SERVICES

(71) Applicant: Amazon Technologies, Inc., Seattle, WA (US)

(72) Inventors: Norbert Paul Kusters, Redmond, WA (US); John Robert Smiley, Issaquah, WA (US); Marc John Brooker, Seattle, WA (US); Bei-Jing Guo, Seattle, WA (US); Marc Levy, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 112 days.

(21) Appl. No.: 15/645,909

(22) Filed: Jul. 10, 2017

(65) Prior Publication Data

US 2017/0308406 A1   Oct. 26, 2017

Related U.S. Application Data

(63) Continuation of application No. 14/675,576, filed on Mar. 31, 2015, now Pat. No. 9,703,602.

(51) Int. Cl.
*G06F 9/50* (2006.01)
*G06F 9/48* (2006.01)
*G06F 3/06* (2006.01)

(52) U.S. Cl.
CPC ............ *G06F 9/5011* (2013.01); *G06F 3/061* (2013.01); *G06F 3/067* (2013.01); *G06F 3/0656* (2013.01); *G06F 9/4881* (2013.01); *G06F 9/50* (2013.01); *G06F 2209/503* (2013.01); *G06F 2209/504* (2013.01); *Y02D 10/22* (2018.01)

(58) Field of Classification Search
CPC .................................................... G06F 9/5011
See application file for complete search history.

(56) References Cited

U.S. PATENT DOCUMENTS

| 8,504,691 | B1 | 8/2013 | Tobler et al. |
|---|---|---|---|
| 2005/0174944 | A1 | 8/2005 | Legault et al. |
| 2011/0010427 | A1 | 1/2011 | Jnagal et al. |
| 2013/0163429 | A1 | 6/2013 | Dunstan et al. |

(Continued)

OTHER PUBLICATIONS

"LVM Administratorator's Guide," https://www.centos.org/docs/5/html/Cluster_Logical_Volume_Manager/index.html, retrieved Mar. 23, 2016, 6 pages.

(Continued)

*Primary Examiner* — Charlie Sun
(74) *Attorney, Agent, or Firm* — Davis Wright Tremaine LLP

(57) ABSTRACT

Burst throttling methods may be used to manage computing resources of a data storage service. Tokens may represent I/O operations executed by a customer of the data storage service. A first token bucket may contain a set of tokens representing the overall I/O operation capacity of the data storage service. Additionally, a second token bucket may contain a set of tokens for a given logical volume maintained by the data storage service. When I/O requests are received tokens may be charged the first token bucket and the second token bucket. Furthermore, if there is sufficient capacity, the data storage service may charge a reduced number of tokens to the third token bucket.

20 Claims, 8 Drawing Sheets

(56) References Cited

U.S. PATENT DOCUMENTS

| | | |
|---|---|---|
| 2013/0242742 A1 | 9/2013 | Nishimura |
| 2014/0130055 A1 | 5/2014 | Guha |
| 2015/0036503 A1 | 2/2015 | Kaplan et al. |
| 2015/0178015 A1 | 6/2015 | Povzner et al. |
| 2015/0373017 A1* | 12/2015 | Oelke ................. G06F 11/3048 726/9 |
| 2016/0036720 A1* | 2/2016 | Kuznetsov ............ H04L 47/783 709/225 |
| 2016/0142323 A1* | 5/2016 | Lehmann .............. H04L 47/215 709/226 |

OTHER PUBLICATIONS

Craciunas et al., "I/O Resource Management Through System Call Scheduling," ACM SIGOPS Operating Systems Review, 42(5):44-54, 2008.
Kaldewey et al., "Virtualizing Disk Performance," Real-Time and Embedded Technology and Applications Symposium, 2008, Apr. 22-24, 2008, pp. 319-330.
Kurose et al., "Computer Networking: A Top-Down Approach," 6th edition, Pearson Education, Inc., © 2013, pp. 645-647.
Nahrstedt, "CS414—Multimedia Systems Design, Lecture 16—Multimedia Transport Subsystem (Part 3)," Spring 2009, 25 pages.
Wong et al., "Zygaria: Storage Performance as a Managed Resource," IEEE Computer Society, 12th IEEE Real-Time and Embedded Technology and Applications Symposium, Apr. 4-7, 2006, 10 pages.
Wu et al., "Hierarchical Disk Sharing for Multimedia Systems," NOSSDAV 2005 Proceedings of the International Workshop on Network and Operating Systems Support for Digital Audio and Video, pp. 189-194.

* cited by examiner

BURST THROTTLING FOR MULTI-TENANT STORAGE SERVICES

CROSS REFERENCE TO RELATED APPLICATION

This application is a continuation of U.S. patent application Ser. No. 14/675,576, filed Mar. 31, 2015, entitled "BURST THROTTLING FOR MULTI-TENANT STORAGE SERVICES," the disclosure of which is hereby incorporated herein in its entirety.

BACKGROUND

Several leading technology organizations are investing in building technologies that provide customers with access computing resources. Such services provide access to computing and/or storage resources (e.g., storage devices providing either a block-level device interface, or a web service interface) to customers or subscribers. Within multi-tier ecommerce systems, combinations of different types of resources may be allocated to customers and/or their applications, such as whole physical or virtual machines, CPUs, memory, network bandwidth, or I/O capacity. Block-level storage devices implemented at storage service may be made accessible, for example, from one or more physical or virtual machines implemented by another service.

Computer systems that provide services to customers may employ various techniques to protect the computer systems from an overwhelming number of service requests that could potentially overload the computer systems. In general, a computer system is considered to be in an "overloaded" state if it is not able to provide the expected quality of service for at least some portion of customer requests it receives. Common solutions applied by overloaded computer systems include denying service to customers or throttling a certain number of incoming requests until the computer systems get out of an overloaded state. Such techniques may for example be employed at storage servers in some embodiments on a per-storage-device level.

Some current computer systems avoid an overload scenario by comparing the request rate with a fixed global threshold and selectively refusing service to customers once this threshold has been crossed. However, it is difficult, if not impossible, to define a single global threshold that is meaningful (much less that provides acceptable performance) in a computer system that receives different types of requests at varying, unpredictable rates, and for which the amount of work required to satisfy the requests is also varying and unpredictable in at least some cases. While many services may have been designed to work best when client requests are uniformly distributed over time, in practice such temporal uniformity in work distribution is rarely encountered. Computing resource service providers that wish to achieve and retain high levels of customer satisfaction may need to implement techniques that deal with temporal and spatial workload variations in a more sophisticated manner.

BRIEF DESCRIPTION OF THE DRAWINGS

Various embodiments in accordance with the present disclosure will be described with reference to the drawings, in which.

DETAILED DESCRIPTION

Figure 1:
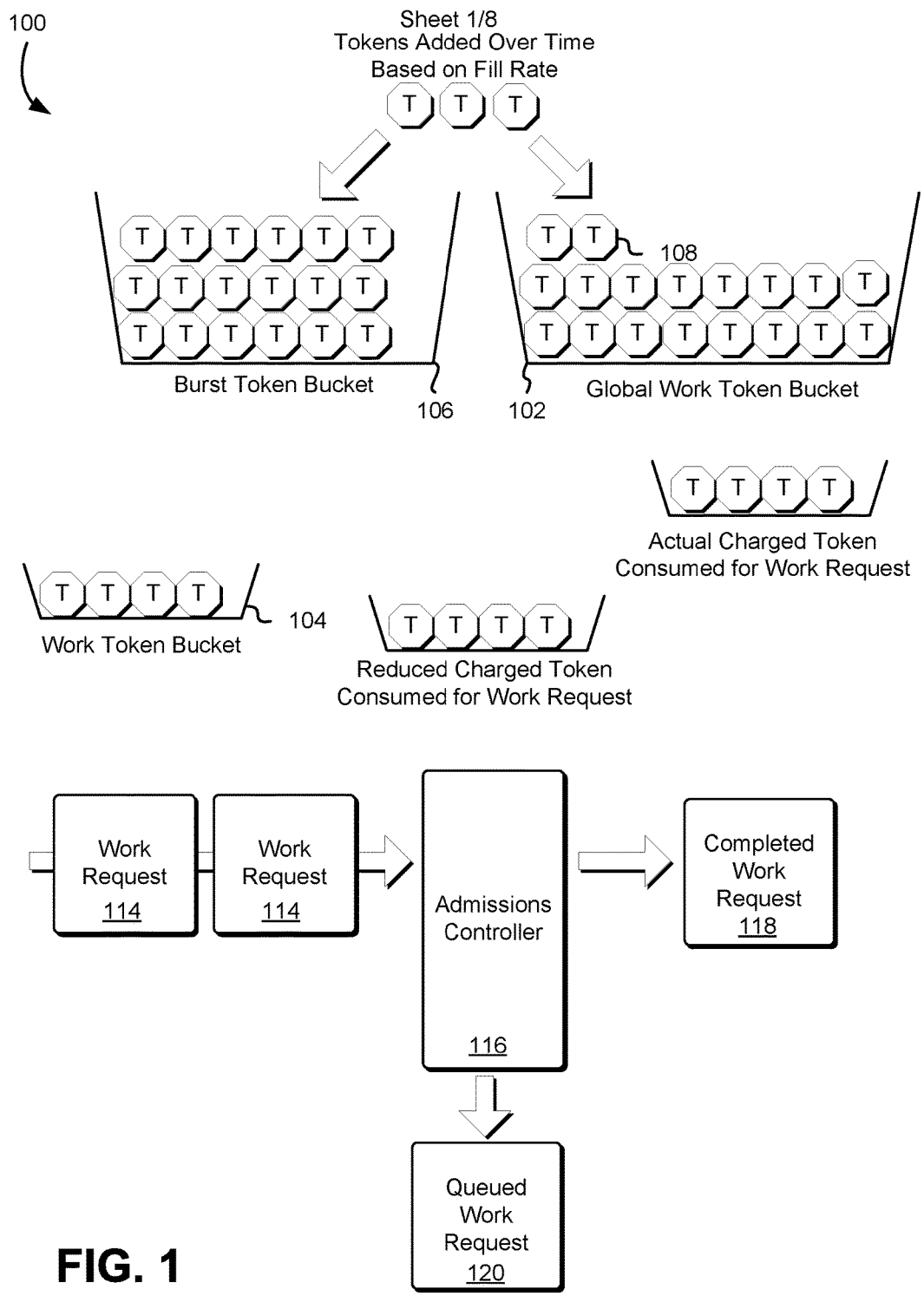
FIG. 1 illustrates aspects of an admissions control mechanism that utilizes a global work token bucket in combination with work token buckets to schedule operations, according to an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to improvements to burst-throttling methods for multi-tenant block-level data storage services. A data storage service may be provided by a computing resource service provider, and the data storage service may use one or more network attached storage devices, such as block-level storage devices, to provide data storage for customers of the computing resource service provider. In order to reduce the cost of the computing resources, such as the block-level storage devices, provided to the customers of the computing resource service provider, computer systems providing the customers with access to the computing resources may be "oversubscribed." Oversubscribing computing resources may include offering more of the computing resource to customers than there is actually physical capacity for on the computer systems providing the computing resources to the customers. In general, a customer may not consume the entire portion of the computer systems resources allocated to the customer. Oversubscription may enable the computing resource service provider to increase efficiency and reduce the amount of un-utilized or under-utilized computing resources made available to customers. When computing resources of the computer system are oversubscribed, the computer system may become overloaded when multiple customers attempt to consume the entire portions of their allotted computing resources at or near the same time. Throttling techniques described herein may be used to prevent the computer system from being overloaded while enabling the customers to continue to receive a high level of performance.

For example, the data storage service may provide the customers with access to block-level storage devices allowing the customer a certain number of Input/Output Operations per Second (IOPS). The data storage service may enable burst allocation of resources enabling customers with spikey workloads (e.g., workloads of varying sizes and intervals) to receive greater performance when required. For example, burst allocation may provide up to 3,000 IOPS for 30 minutes in order to provide better performance during particular workloads, such as during boot operations or accessing large files. A certain level of burst allocation may be provided regardless of the size of the block-level storage volume. For example, a burst allocation of 3,000 IOPS for 30 minutes may be provided for volumes of 1 Gigabytes (Gb) or 300 Gb. The data storage service may analyze customer workload and determine a particular amount of computing resources to allocate to the customer during burst allocation.

In order to provide the customer with computing resources during burst allocation a burst token bucket model may be used. The burst token bucket model may allocate customers a certain number of tokens. Each token may represent an "I/O credit" that may be used by the customer to perform one read or one write operation. For example, a token may be removed from a burst token bucket associated with a particular customer for each I/O operation requested by the customer and performed by the data storage service. Additionally, the tokens may correspond to a particular size I/O operation. For example, a token may correspond to a 4 kb I/O operation. In this example, one read or write operation may be a 4 kb I/O operation. Therefore, if the customer submits a request including a 16 kb I/O operation, processing the request may require 4 work tokens. A particular burst token bucket may be associated with each customer volume and the burst token bucket may hold up to a maximum number of tokens (e.g., a burst token bucket may hold up to 5 million tokens). The burst token buckets may be initially allotted a certain number of tokens and/or may accumulate tokens over time and at a certain rate. For example, tokens may accumulate at a rate of 3 tokens per configured Gb per second, up to the maximum capacity of the burst token bucket. Additionally, the customer may be able to use tokens up to a maximum rate. The customer may use tokens by providing the data storage service with a request to perform I/O operations and the data storage service preforming the I/O operations on behalf of the customer. For example, a customer may be able to spend tokens at a rate up to 3,000 tokens per second per volume which equates to a maximum IOPS rate of 3,000. This maximum IPOS rate may be considered that maximum performance level of the volume and the baseline performance level of the volume may be equal to the rate at which tokens are accumulated (e.g., returning to the example above the fill rate of 3 tokens per Gb per second or 3 IOPS per Gb per second). Tokens may be first removed from the bust token bucket and then if there is insufficient capacity in the burst token bucket a secondary throttling mechanism may be used.

For example, the data storage service may maintain a global work token bucket. The global work token bucket may correspond to the total capacity of the computer systems operating the logical volumes on behalf of the customers. For example, a particular computer system may have a maximum capacity of 10,000 IOPS. Therefore, the global token bucket when the system has 0 percent load may contain 10,000 tokens. When a customer request including an I/O operation is received at the data storage service a number of tokens equaling the I/O operations may be removed from the global token bucket. For example, if the customer request includes a 32 kb I/O operation, a number of tokens equaling 32 kb may be removed from the global work token bucket (e.g., if the token size is 16 kb two tokens may be removed). Once the tokens are removed from the global work token bucket, the data storage service may attempt to remove tokens from the work token bucket associated with the logical volume.

As described above, each logical volume may have associated with it a burst token bucket associated with an amount of allocated computing resources available to the logical volume. When an I/O request is received at the data storage service, a token may be removed from the burst token bucket and the global token bucket if there is sufficient capacity in each. If there is insufficient capacity in the burst token bucket, a token may be removed from the global work token bucket and another token may be removed from a work token bucket associated with the volume. The burst token bucket may operate as an initial throttling mechanism and if the burst token bucket is empty or below a threshold capacity a second throttling mechanism may be used. For example, a number of tokens corresponding to the received I/O request may be removed from the burst token bucket corresponding to a logical volume indicated in the received I/O request and a global token bucket indicative of the overall load on the system processing the I/O request. However, if the burst token bucket does not have sufficient tokens to remove the number of tokens corresponding to the received I/O request (e.g., if after removing the number of tokens the burst token bucket would have less than zero tokens or less than some threshold value) the system may delay processing the request based at least in part on a fill rate of the burst token bucket. After delaying the request, if the burst token bucket still have insufficient tokens, the tokens may be removed from a work token bucket associated with the logical volume indicated in the request.

In various embodiments, fewer tokens than the number of tokens removed from the global token bucket are removed from the work token bucket for the volume in order to allow the logical volume to achieve greater performance (e.g., allowing the customer to use fewer tokens for the same amount of work request if the server has additional capacity). For example, a customer may provide an I/O request equaling one token to the data storage service, and the data storage service may remove one token from the global work token bucket and ⅓ of a token from the work token bucket for the logical volume. The amount of tokens charged the customer for a particular I/O request or set of I/O requests may be dynamically determined based on a variety of factors including the load on the data storage service, the level of performance allocated to the customers, the type of I/O request (e.g., sequential or non-sequential), and other factors described in greater detail below.

FIG. 1 illustrates an environment 100 in which an admissions control mechanism utilizes a global work token bucket 102 in combination with burst token bucket 106 to schedule operations, according to an embodiment. Generally speaking, such mechanisms may be used for workload management of various types of activities, such as storage objects, database tables, database partitions, and other workloads that include the partitioning and/or allocation of computing resources. In the context of a block storage service, such buckets may be maintained for various volumes or volume partitions by one or more admissions controllers 116, at either an instance host, storage server, or both. For example, the admissions controller 116 may be a set of computer instructions or other logic configured to maintain state information corresponding to the storage server in a memory of the storage server. The state information including a mechanism that uses a single global work token bucket 102 of tokens is illustrated in FIG. 1 for simplicity of presentation; however, combinations of multiple global work token buckets may be used in some embodiments, such as one bucket for read operations and a different bucket for write operations. In addition to the global work token bucket 102, the mechanism may include a set of burst token buckets 106 and a set of work token buckets 104, and each burst token buckets 106 and work token bucket 104 may correspond to a logical volume or partitioned volume implemented by the storage server.

A global work token bucket 102, a burst token buckets 106 and a work token bucket 104 (e.g., a logical container which may be implemented as a data structure within a software program) set up for admissions control purposes associated with a particular storage server or entity of the storage server, such as a block-level storage device (e.g., a volume, or a portion of a volume) may be populated with an initial set of tokens during bucket initialization or server initialization. The initial population may be determined, e.g., based on expectations of the workload, service level agreements, a provisioning budget specified by the client that owns or manages the corresponding data object, or some combination of such factors in various embodiments. For some types of buckets the initial population may be set to zero in some embodiments. In some implementations the initial population of a bucket may be set to a maximum population for which the bucket is configured. The global work token bucket 102 may be populated with a number of tokens equal to the maximum capacity of the storage server.

When an indication of a new work request 114 (such as a read request or a write request in the case of a storage object or database object) is received at an admissions controller 116, the admissions controller 116 may attempt to determine whether some number N of tokens 108 (where N may be greater than or equal to 0, depending on implementation or on configuration parameters) are present in the burst token bucket 106. Then the admissions controller may attempt to determine whether some number N of tokens (where N may be greater than or equal to 1, depending on implementation or on configuration parameters) are present in the global work token bucket 102 in the depicted embodiment. If that number of tokens is available in the burst token bucket 106 and the global work token bucket 102, the work request 114 may be accepted or admitted for execution immediately, and the tokens may be consumed or removed from both the burst token bucket 106 and the global work token bucket 102. Otherwise, if N tokens are not present, the acceptance of the work request 114 may be deferred until sufficient tokens become available in the depicted embodiment. In the illustrated scenario, work request 118 has been accepted and completed, work request 120 has been deferred and queued, and other work requests 114 are yet to be considered by the admissions controller 116.

The deferred work request may eventually be accepted, when sufficient tokens eventually become available in both the work token bucket 104 and the global work token bucket 102 or alternatively when sufficient tokens eventually become available in both the burst token bucket 106 and the global work token bucket 102. In some embodiments, if a particular work request does not get accepted within some timeout window, it may be rejected by the admissions controller. Rejected work requests may be resubmitted or retried in some implementations. In at least some embodiments, if sufficient tokens are not available in the work token bucket 104 and/or the global work token bucket 102, when the work request is processed by the admissions controller 116, the work request may be rejected immediately instead of being deferred.

As shown by FIG. 1, the burst token bucket 106, the work token bucket 104, and the global work token bucket 102 may be refilled or repopulated over time, e.g., based on configuration parameters, such as a refill rate associated with the bucket, as described below with reference to FIG. 4. In some implementations, token refill operations may accompany, or be performed in close time proximity to, consumption operations (e.g., within a single software routine, N tokens may be consumed for admitting a request, and M tokens may be added based on the refill rate and the time elapsed since the bucket was last refilled). Refill rates or token counts of a given work token bucket 104 and/or burst token bucket 106 may be modified by client-side components of a storage service, e.g., to allow higher work request rates to be handled, typically for short time intervals. Limits may be placed on the maximum number of tokens a work token bucket 104 and/or burst token bucket 106 may hold in some embodiments, and/or on the minimum number of tokens, e.g., using configuration parameters. Using various combinations of configuration parameter settings, fairly sophisticated admissions control schemes may be implemented in different embodiments.

In one simple example scenario, to support a steady load of 100 work requests per second, work token bucket 104 of FIG. 1 may be configured with an initial population of 100 tokens, a maximum allowable population of 100 tokens and a minimum of zero tokens; N may be set to 1, and the refill rate may be set to 100 tokens per second, and one token may be added for refill purposes (assuming the maximum population limit is not exceeded) once every 10 milliseconds. As work requests 114 arrive, one token may be consumed for each work request. If a steady-state workload at 100 work requests per second, uniformly distributed during each second, is applied, the refill rate and the workload arrival rate may balance each other. Such a steady-state workload may be sustained indefinitely in some embodiments, given the bucket parameters listed above.

In another example, to support an inconsistent or spiky workload (e.g., workloads that vary in both frequency and amplitude), burst token bucket 106 of FIG. 1 may be configured with an initial population of 0 tokens and a fill rate based at least in part on the size of the logical volume or partition volume associated with the bucket. For example, a fill rate of 3 tokens per second per Gb may be applied to the burst token bucket 106. Furthermore, the burst token bucket 106 may be configured to enable a maximum number of tokens to be removed from the bucket per second (e.g., 3,000 tokens per second may be removed from the bucket when processing work requests 114). Additionally, the admissions controller 116 may be configured to remove less than 1 token or a fraction of a token per processed work request 114 to allow for additional workload capacity to be allocated to logical volume or partitioned volume. For example, the work token bucket may have a maximum capacity of 1,000 tokens but the admissions controller 116 may be configured to remove ⅓ of a token per completed work request 118 in order to allow the customer to burst the performance of the logical volume or partitioned volume to 3,000 IOPS. While the burst token bucket 106 may be configured, in various embodiments, to consume less than 1 complete token, the global work token bucket 102 may still consume a complete token. In this way the total system capacity of the storage server may be reflected in the global work token bucket 102. For each work request 114, the admissions controller 116 may remove N tokens from the global work token bucket 102 and some number less than N from the burst token bucket 106. As described above, if either the burst token bucket 106 or the global work token bucket 102 does not contain sufficient tokens to process the work request 114, the request may be delayed or queued until both the work token bucket 104 and the global token bucket contain sufficient tokens.

If, extending the above example, the arrival rate and/or the refill rate is not uniform, scenarios may arise in which the burst token bucket 106 or the global work token bucket 102 remains empty for some (typically small) time intervals (e.g., if some set of work requests in rapid succession consumes more tokens than the refill mechanism is able to replace). In such a case, an arriving work request may have to be rejected (or retried after a delay). In order to deal with temporal non-uniformity of workloads without introducing substantial delays or high rejection rates, various techniques may be employed in different embodiments, such as the temporary modifications of admissions control parameters by client-side components.

Figure 2:
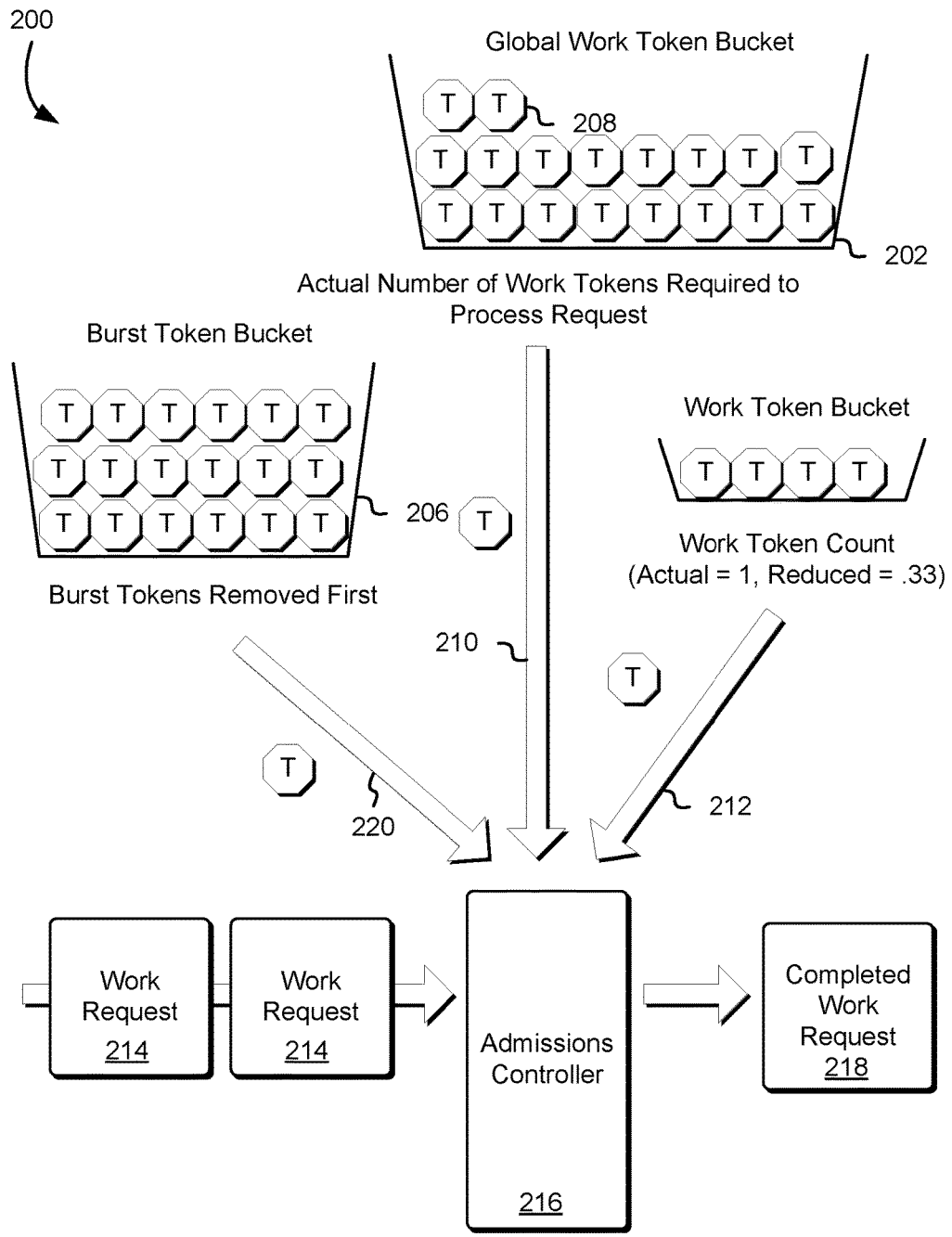
FIG. 2 illustrates aspects of an admissions control mechanism that utilizes a global work token bucket in combination with work token buckets to schedule operations, according to an embodiment.

FIG. 2 illustrates aspects of an admissions control mechanism that utilizes a global work token bucket in combination with burst token buckets and work token buckets to schedule operations, according to an embodiment. As described above, the admissions control mechanism may be used to allocate resources of a storage server between various volumes or partitioned volumes operated by customers of a computing resource service provider. A global token bucket 202, a burst token bucket 206 and a work token bucket 204 (e.g., a logical container which may be implemented as a data structure within a software program) set up for admissions control purposes associated with a particular storage server or entity of the storage server, such as a block-level storage device, may be populated with an initial set of tokens 208 during bucket initialization or server initialization. As illustrated in FIG. 2, an admissions controller 216 may process work request 214 by at least charging or removing work tokens 208 from the global work token bucket 202, burst token bucket 206, or the work token bucket 204. The admissions controller 216 may be executable instructions executed by one or more processors of the data storage as described above.

In the example illustrated in FIG. 2, a work request 214 is received at the admissions controller 216. The work request 214 may be an I/O operation, such as a read or write operation. The work request 214 may include volume identification information, an offset, and a length. The information included in the work request 214 may enable the admissions controller 216 to determine a number of tokens 208 to remove from the burst token bucket 206 and then the global work token bucket 202 and the work token bucket 204 if required. Additionally, in various embodiments, the information included in the work request 214 enables the storage server to perform that I/O operation. For example, the storage server may use the volume identification information, the offset, and the length to retrieve a data object from a storage device on behalf of the customer.

Once the work request 214 is received by the admissions controller 216, the admissions controller 216 may determine a number N of tokens corresponding to a capacity of the data storage server required to process the request. For example, a token may represent a 16 kb I/O operation, therefore a work request 214 including a 16 kb read operation would cost a single token 208. In various embodiments, the admissions controller 216 first removes the number of tokens N from the burst token bucket 206, represented by the arrow 220 in FIG. 2. In various embodiments, the admissions controller 216 remove a number of tokens less than the number of tokens N from the burst token bucket 206. The admissions controller 216 may then remove from the global work token bucket 202 the number of work tokens 208 required to complete the work request 218, represented by the arrow 210 in FIG. 2. In various embodiments, if there is insufficient capacity in the burst token bucket 206 to remove the number of tokens N, the admissions controller 216 may then determine a second number of tokens to remove from the work token bucket 204. The admissions controller 216 may determine a reduced number of work tokens 208 to remove from the work token bucket. If there is sufficient capacity in the global token bucket 202, the admissions controller may determine, based at least in part on a token consumption policy (described in greater detail below in connection with FIG. 4), an amount of tokens less than the amount of tokens removed from the global token bucket 202 to remove from the work token bucket 204. This may enable customers, when there is sufficient storage service capacity, to receive a higher number of IOPS or the same number of IOPS for a longer period.

As illustrated by the arrow 212 in FIG. 2, an actual number of tokens corresponding to the work request 214 and a reduced number of tokens may be obtained by the admissions controller. The reduced number of tokens may be determined dynamically or may be fixed. The reduced number of tokens may be determined based at least in part on various attributes of the storage service, the customer, and/or the volume. For example, the reduced number of tokens may be based on a current capacity of the global work token bucket 202, the size of the volume associated with the work token bucket 204, or a number of IOPS purchased by the customer. In the example illustrated in FIG. 2, the reduced number of tokens equals 0.33. For each work request 214 the reduced number of work tokens may be dynamically determined. For example, a set of work requests 214 may be tracked and for each work request 214 that is sequential a reduced number of work tokens may be charged. The reduced number of tokens may be removed first from the burst token bucket 206 so long as there is sufficient capacity and then from the work token bucket once the capacity of the burst token bucket 206 has been depleted. This may allow the customer to increase work rate for a period of time after which the work rate may be reduced based at least in part on a maximum work rate of the work token bucket.

Figure 3:
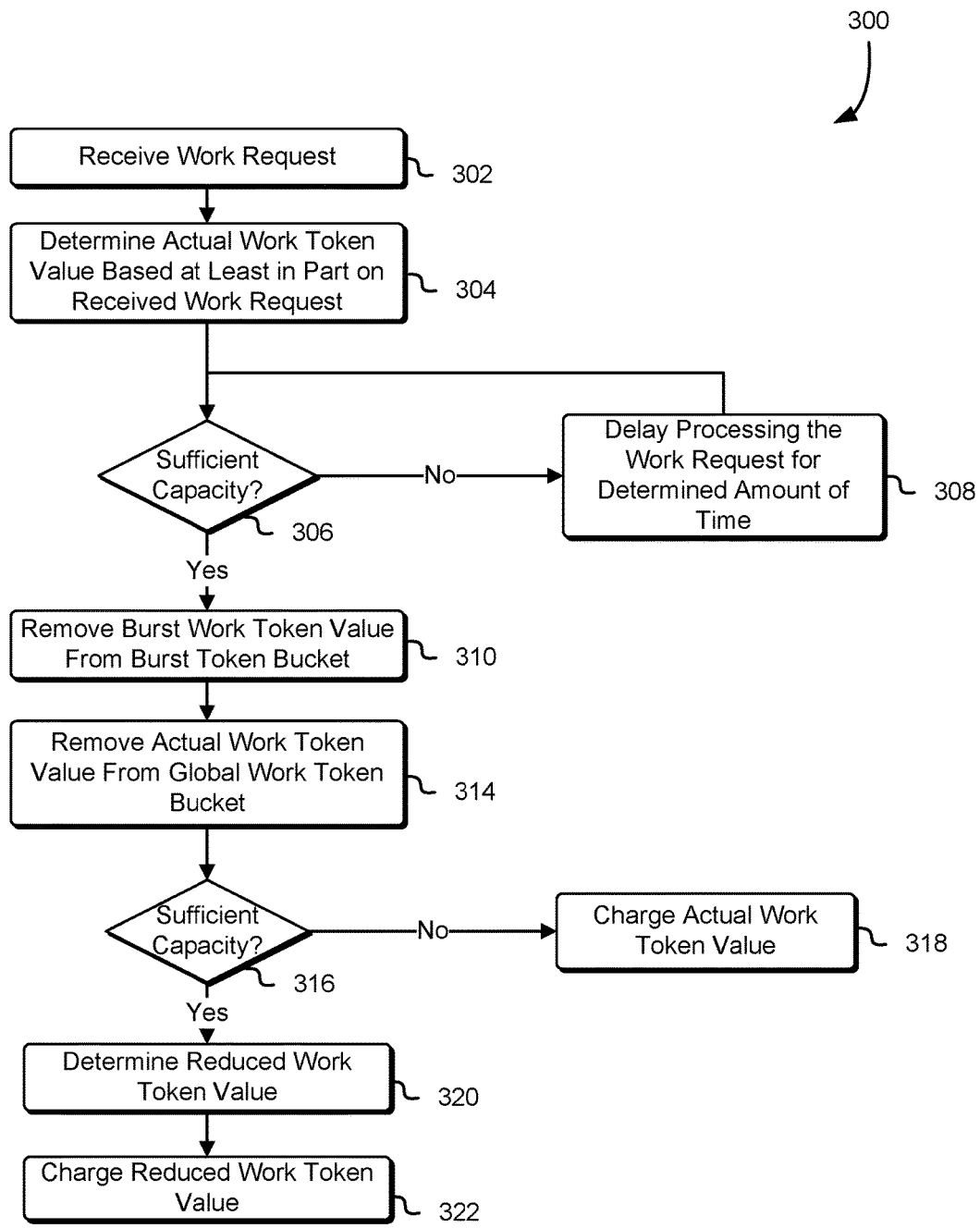
FIG. 3 shows an illustrative process which may be used to determine a reduced number of work tokens to charge for a work request in at least one embodiment.

FIG. 3 shows an illustrative process 300 which may be used to determine a reduced number of work tokens to charge for a work request in at least one embodiment. The process 300 may be performed by any suitable system such as the admissions controller described above in FIGS. 1 and 2 or any combination of systems or component thereof such as the data storage service described above. Returning to FIG. 3, in an embodiment, the process 300 includes receiving a work request 302. The work request may be a request to perform an I/O operation as described above or may be any operation that requires an allocation of computing resources to an operation to be performed by the computing resources. After receiving the work request, the admissions controller or other system executing process 300 may determine a actual work token value based at least in part on a the received work request 304. For example, the actual token value may be based at least in part on an amount of computing resources required to process the request. In another example, if a logical volume can burst up to 100 request per second, the work token value may be 1/100 for the a particular request. In various embodiments, a reduced number of tokens is based on a maximum burst IOPS made available to the customer. In a specific example, if the work token bucket contains a maximum of 1,000 tokens and the maximum burst IOPS allotted to the customer is 3,000 IOPS, the reduced amount charged for a token may be 1/3 of a token.

The admissions controller may then determine if there is sufficient capacity to remove the determined number of token from the burst token bucket 306. If there is insufficient capacity, the admission controller may delay processing the work request for a determine interval of time 308. The admissions controller may delay processing the request based at least in part on a fill rate of the burst token bucket and number of tokens to be removed from the bust token bucket. If there is sufficient capacity in the burst token bucket, the number of determined tokens may be removed from the burst token bucket 310. The admissions controller or other system executing process 300 may then remove, from the global token bucket, the actual number of work tokens to be charged for performing the work request 314. As described above, the work token value may correspond to a percentage or amount of computing resources required to be allocated in order to complete the requested operation.

In certain variations to the process 300, if there is still insufficient capacity in the burst token bucket after processing of the request has been delayed for the determined amount of time, the admission controller may initiate a second throttling mechanism. Returning to FIG. 3, once determined number of work tokens has been removed from the global work token bucket, the current capacity of the global work token bucket may indicate the overall capacity of the computer system processing the received work request. Additionally, the level of the global work token bucket may indicate whether the system is overloaded. The admissions controller may then determine if there is sufficient capacity to charge a reduced amount of work tokens 316.

The admissions controller may determine if there is sufficient capacity based at least in part on an amount of tokens in the global work token bucket. For example, if after removing the work tokens from the global token bucket, as in step 314, there are zero tokens remaining in the global token bucket the admissions controller may determine that there is insufficient capacity to charge the reduced work token amount. If there is insufficient capacity in the global work token bucket, the admission controller can remove the actual work token value from the work token bucket 318. Conversely, if one or more tokens remain in the global token bucket after removing the actual work token value from the global token bucket, the admissions controller may determine that there is sufficient capacity to remove the reduced work token amount from the work token bucket 322. The admissions controller may then determine a reduced amount of work tokens 320 to be charged to the work token bucket associated with the volume indicated in the received work request. The reduced amount of work tokens may be determined based at least in part on a variety of factors. For example, the reduced number of tokens may be based on a minimum number of IOPS allocated to the customer.

In some embodiments, the process 300, the capacity of the burst token bucket and the global token bucket may be allowed to go below zero to allow for removal of work tokens even if removing the tokens would cause the number of tokens in the bucket to drop below zero.

Figure 4:
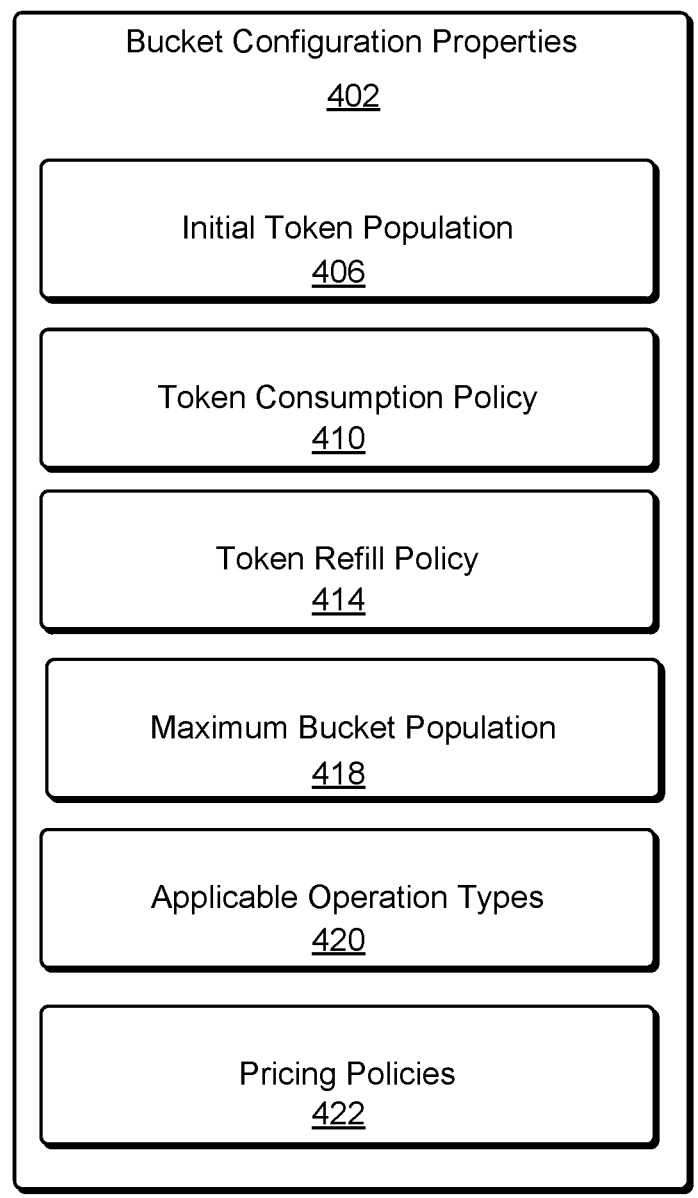
FIG. 4 illustrates configuration properties of a token bucket, such as the global token bucket or work token bucket, which may be used for implementing various types of admissions control policies, according to at least one embodiment.

FIG. 4 illustrates example configuration properties 402 of a token bucket, such as the burst token bucket 106, the global work token bucket 102, or work token bucket 104 illustrated in FIG. 1, which may be used for implementing various types of admissions control policies, according to at least one embodiment. In some implementations, the token bucket may be implemented as an in-memory data structure of the admissions controller, and may be written to persistent storage as needed. Such a data structure may comprise fields representing the current token population, when the population was last modified, and/or values for various parameters and policies indicated in FIG. 4.

A token consumption policy 410 may indicate how tokens are to be consumed for admissions control, and the timing of the consumption (e.g., whether all the tokens are to be consumed prior to accepting a work request, or whether some tokens may be consumed later based on the actual amount of work performed for the accepted request). In various embodiments, the token consumption policy 410 may indicate a reduced number of work tokens to be consumed and when the reduced number of tokens may be consumed. For example, the token consumption policy 410 may indicate a particular fraction of a token that may be consumed when there is a sufficient number of tokens remaining in the global token bucket. Additionally, the token consumption policy 410 may include a formula or method for dynamically calculating an amount of tokens to be consumed for a give operation.

In some embodiments different numbers of tokens may be consumed for different types of operations from a given bucket based on its consumption policy—e.g., I/O operations may be classified as "large" or "small", and different amounts of tokens may be consumed based on the size of the I/O operation. In some embodiments, a token consumption policy 410 may also specify a decay-during-idle parameter indicating whether (and at what rate) tokens are to be deleted from the bucket if the corresponding work target is not targeted for work requests for some time, or a transfer-upon-idle parameter indicating whether tokens should be transferred from one bucket to another (e.g., from a bucket of a lightly-used volume to a bucket of a more heavily-used volume) if they are not used during some time interval. In one embodiment, a staleness policy may be used to consume tokens that have not been consumed for a specified time interval—e.g., each token may be associated with a validity lifetime after which the token may no longer be useful for admissions control purposes.

The bucket configuration properties 402 may also include an initial token population parameter 406, as depicted in an embodiment illustrated in FIG. 4, which indicates how many tokens are to be placed in the bucket at startup or initialization. Token refill policy 414 may indicate at what rate, and/or under what circumstances, tokens are to be added to the bucket, e.g., to help sustain a rate of work for which the work target associated with the bucket has been configured. One or more of the parameters of the bucket may be changed over time—e.g., a default refill rate may apply to the bucket, but in order to accommodate higher-than-provisioned rates, a higher non-default rate may be used at least temporarily. As described above, the token refill policy 414 may be based on a size of the volume or partitioned volume. Furthermore, the token refill policy 414 may indicate whether to track a number of tokens that are attempted to be added to the bucket according to the fill rate but cannot be added because the bucket is at or above a maximum population indicated by a maximum bucket population parameter 418. For example, the data storage service may track a number of tokens added to the burst token bucket when the burst token bucket is full (e.g., if the bust token bucket has a maximum capacity of 3,000 tokens the data storage system may track the number of tokens that would have been added according to the token refill policy 414 but are not due to the maximum bucket population parameter 418).

The maximum bucket population parameter 418 may indicate the maximum capacity of the bucket and the corresponding work target. In some embodiments, different types of operations may have different admissions control rules (e.g., reads may have different rules than writes, or I/Os may have different rules based on the amount of data read or written) and the types of operations for which the bucket is to be used may be specified in applicable operation types parameter 420. In at least some embodiments, one or more pricing policies 422 that may be used to determine the amounts that clients are to be charged for the use of the bucket's tokens may be indicated in the bucket properties. In different embodiments, only a subset of the example parameters shown in FIG. 4 may be employed, while in other embodiments, additional bucket configuration parameters beyond those shown in FIG. 4 may be used. Values and/or settings for various properties shown in FIG. 4, as well as other admissions control settings, may be programmatically set or modified (e.g., by the client-side components using web service calls) in at least some embodiments. It is noted that admissions control techniques that do not utilize work tokens may be employed in at least some embodiments.

Figure 5:
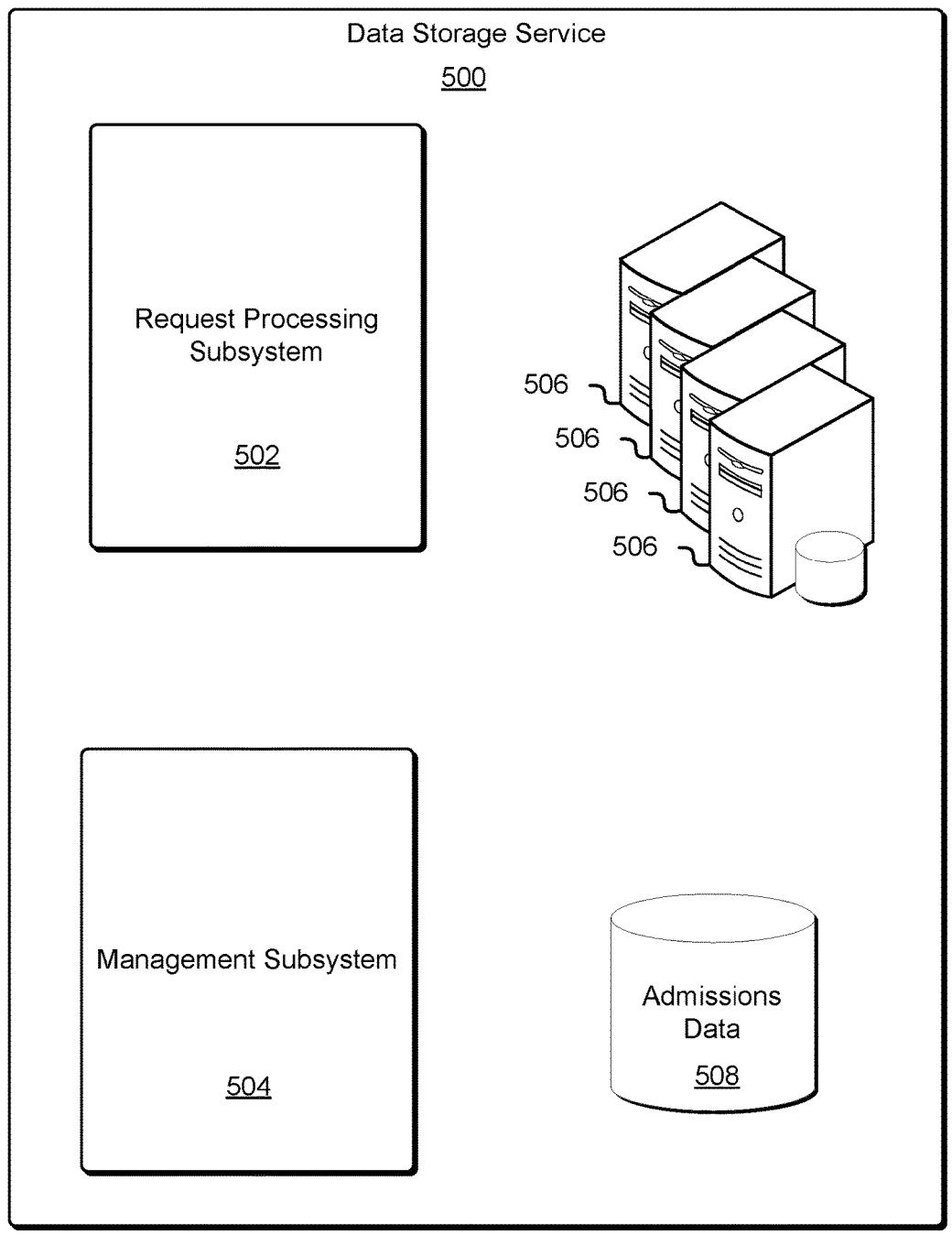
FIG. 5 shows an illustrative example of a data storage service in accordance with various embodiments.

FIG. 5 shows an illustrative example of a data storage service in accordance with at least one embodiment. The data storage service 500 may be a service of a computing resource provider used to operate a block-level data storage service such as described above in connection with FIGS. 1 and 2. As illustrated in FIG. 5, the data storage service 500 includes various subsystems such as a request processing subsystem 502 and a management subsystem 504. The data storage service 500 may also include a plurality of data storage servers 506 and an admissions data 508, which may store data about various global token buckets, burst token buckets, and work token buckets associated with volumes maintained by the data storage servers 506 as described above. In an embodiment, the request processing subsystem 502 is a collection of computing resources, such as webservers and application servers, collectively configured to process requests submitted to the data storage service 500. The request processing subsystem 502, for example, may include one or more webservers that provide a web service interface to enable customers of the data storage service 500 to submit requests to be processed by the data storage service 500. The request may include work requests 114 as described above in connection with FIG. 1. The request processing subsystem 502 may include computer systems configured to make various determinations in connection with the processing of requests, such as whether policy allows fulfillment of a request, whether requests are authentic (e.g., electronically signed using a suitable cryptographic key) and otherwise. In various embodiments, the request processing subsystem 502 may include an admissions controller as described above.

Components of the request processing subsystem may interact with other components of the data storage service 500 (e.g., through network communications). For example, some requests submitted to the request processing subsystem 502 may involve the management of computing resources which may include data objects stored by the data storage servers 506. The request processing subsystem 502, for example, may receive and process requests to modify computing resources. For instance, in some examples, data objects are logically organized into logical data containers. Data objects associated with a logical data container may, for example, be said to be in the logical data container. Requests to the data processing subsystem 502 may include requests for creating logical data containers, deleting logical data containers, providing an inventory of a logical data container, providing or updating access control policy with respect to one or more logical data containers and the like.

The requests may be processed by the management subsystem 504 upon receipt by the request processing subsystem 502. If applicable, various requests processed by the request processing subsystem 502 and/or management subsystem 504 may result in the management subsystem 504 updating metadata associated with data objects and logical data containers stored in a metadata store. Additionally, the management subsystem may include an admissions controller which may update the admissions data 508, described in greater detail below. Other requests that may be processed by the request processing subsystem 502 include requests to perform operations in connection with data objects. The requests, for example, may include requests to upload data objects to the data storage service 500, to download data objects from the data storage service 500, to delete data objects stored by the data storage service 500 and/or other operations that may be performed.

Requests processed by the request processing subsystem 502 that involve operations on data objects (upload, download, delete, e.g.) may include interaction between the request processing subsystem 502 and one or more data storage servers 506. The data storage servers 506 may be computer systems communicatively coupled with one or more storage devices for the persistence of data objects. For example, in order to process a request to upload a data object, the request processing subsystem may transmit data to a data storage server 506 for persistent storage. It is noted, however, that in some embodiments, client (e.g., customer) computer systems may transmit data directly to the data storage servers 506 instead of through severs in the request processing subsystem.

In some embodiments, the request processing subsystem 502 transmits data to multiple data storage servers 506 for the purposes of redundantly storing the data to allow the retrievability of data in the event of failure of an individual data storage server 506 and/or associated data storage device. For example, in some embodiments, the request processing subsystem uses a redundancy in coding scheme such as erasure coding to deconstruct a data object into multiple parts that are stored among the data storage servers 506. The parts may be configured such that if access to a certain number of parts is lost, the data object may nevertheless be reconstructible from the remaining parts that remain accessible.

To enable efficient transfer of data between the request processing subsystem 502 and the data storage servers 506 and/or generally to enable quick processing of requests, the request processing subsystem 502 may include one or more databases that enable the location of data among the data storage servers 506. For example, the request processing subsystem 502 may operate a key value store that serves to associate identifiers of data objects with locations among the data storage servers 506 for accessing data of the data objects.

The admissions data 508 may include information corresponding to the work token buckets or burst token buckets for the various volumes managed by the data storage service 500 and global work token buckets for the data storage service 506. Additionally, the admissions data may contain information corresponding to the received requests, such as information about sequential I/O operations included in various received requests. Returning to FIG. 5, the admissions data 508 may contain data structures, as described above, containing information indicating a number of tokens in a particular bucket, a fill rate for a particular bucket, or other information as described above.

Figure 6:
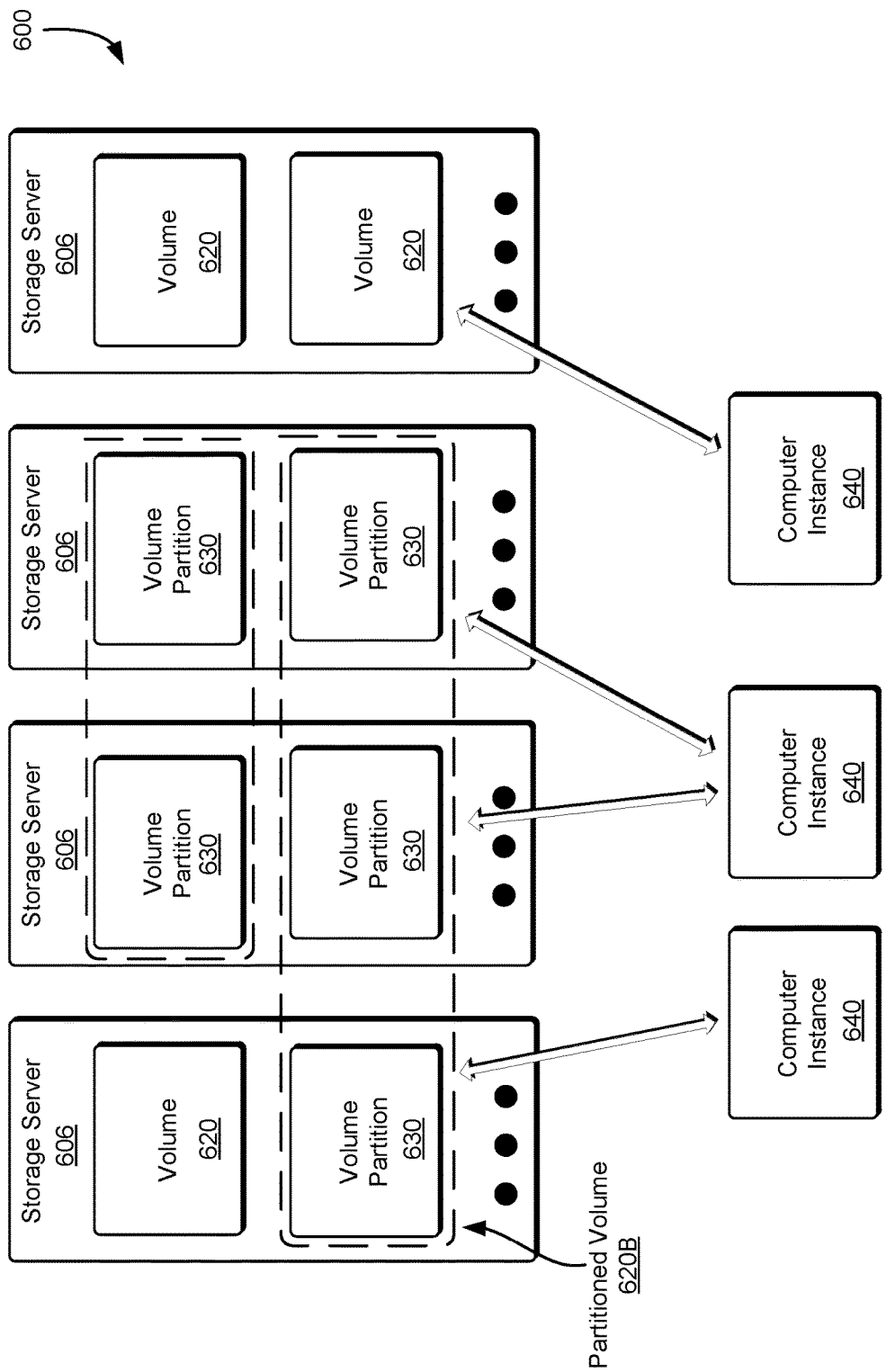
FIG. 6 illustrates an environment in which various aspects of admissions control-related operations for block-level devices that are attachable to one or more computer instances may be implemented, according to at least one embodiment.

FIG. 6 illustrates an environment 600 in which various aspects of admissions control-related operations for block-level devices that are attachable to one or more computer instances may be implemented, according to at least one embodiment. Four storage servers 606 are shown in FIG. 6. A partitioned volume 620B is illustrated, with three partitions, while three non-partitioned volumes 620 are shown. In some embodiments in which partitioned volumes are supported, non-partitioned volumes may simply be managed as volumes that each comprise a single partition. Both partitioned and non-partitioned volumes may be attached to multiple computer instances in the depicted embodiment, e.g., as a result of various "AttachVolume" API calls. Partitioned volume 620B is attached to multiple computer instances, while non-partitioned volume 620 is attached to a single computer instance. A given computer instance such as 640 may be attached to more than one multiply-attached volume (such as 620B) in at least some embodiments.

The computing resource service provider may provide customers with the ability to attach a given volume partition 630 or volume to several different computer instances, each of which could potentially be executing at a different instance host. In some embodiments in which multiple attachments are supported, a client-side component of the different instance hosts involved (i.e., the different instance hosts at which the concurrently-attached instances are running) may exchange workload information for each of the attached instances. In other embodiments, the storage servers 606 involved in implementing the multiply-attached volumes may collect workload information to be used for admissions control decisions. For example, a storage server 606 may collect I/O information of the multiply-attached volume 620B for use in admissions control decision. In some embodiments, the storage servers 606 may be able to isolate the workload metrics for different computer instances that are attached to the same volume or partition, and use the metrics in various admissions control determinations, such as removing work tokens from the global work token bucket, burst token bucket, or work token bucket as described above.

Figure 7:
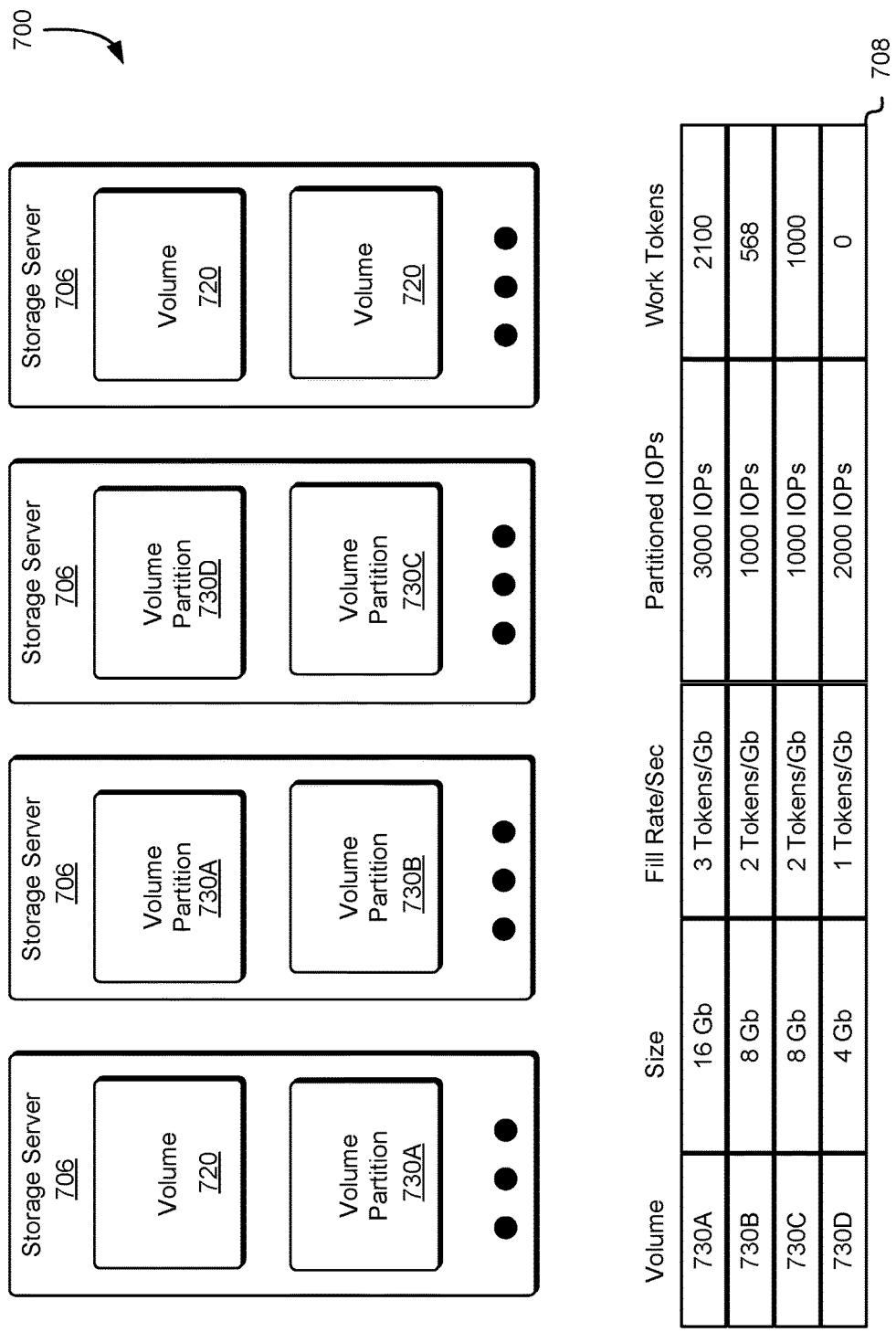
FIG. 7 illustrates an environment in which various aspects of admissions control-related operations for block-level devices that are attachable to one or more computer instances may be implemented, according to at least one embodiment.

FIG. 7 illustrates an environment 700 in which various aspects of admissions control-related operations for block-level devices that are attachable to one or more computer instances may be implemented, according to at least one embodiment. Four partitioned volumes are illustrated in FIG. 7, volume partitions 730A, 730B, 730C, 730D along with other volumes 720. As described above in connection with FIG. 6, the partitioned volumes and other volumes may be attached to one or more computer instances and may be distributed across one or more data storage serves 706. The data storage service may track work requests, including I/O information, across the various data storage servers 706. The information tracked across the various data servers 706 may be aggregated by the data storage service and used to generate a burst token bucket as described above.

The admissions data 708 may contain burst bucket information, such as a number of work token remaining in a particular bucket which is associated with a particular partition. As illustrated by FIG. 7, the data storage service may maintain, in the admissions data 708 as described above, information about volume partitions 730A, 730B, 730C, 730D. The information may include a size of the volume or volume partition, a fill rate per second for the volume or volume partition, a number of IOPS (or PIOPS), and a number of tokens in the burst token bucket. In various embodiments, the admissions data also contains global work token bucket information. For example, the admissions data may include a number of work tokens remaining in the global token bucket. The global work token bucket may correspond to a particular data storage server 706 or set of data storage servers 706.

The admissions data 708 may be maintained by a computer system for all of the data storage servers 706 for the data storage service or each data storage server 706 may maintain the admissions data 708 for the volumes implemented by the data storage server 706. Additionally, a single data storage server 706 may maintain admissions data for a set of data storage servers 706. For example, a set of data storage servers 706 may implement a single volume partitioned over the set of data storage servers 706. One of the members of the set of data storage servers 706 may maintain the burst token bucket for the partitioned volume implemented using computing resources of the set of data storage servers 706. Although a single member of the set of data storage server 706 maintains the burst token bucket, each data storage serve 706 may nevertheless maintain its own global work token bucket information for the data storage server 706.

Figure 8:
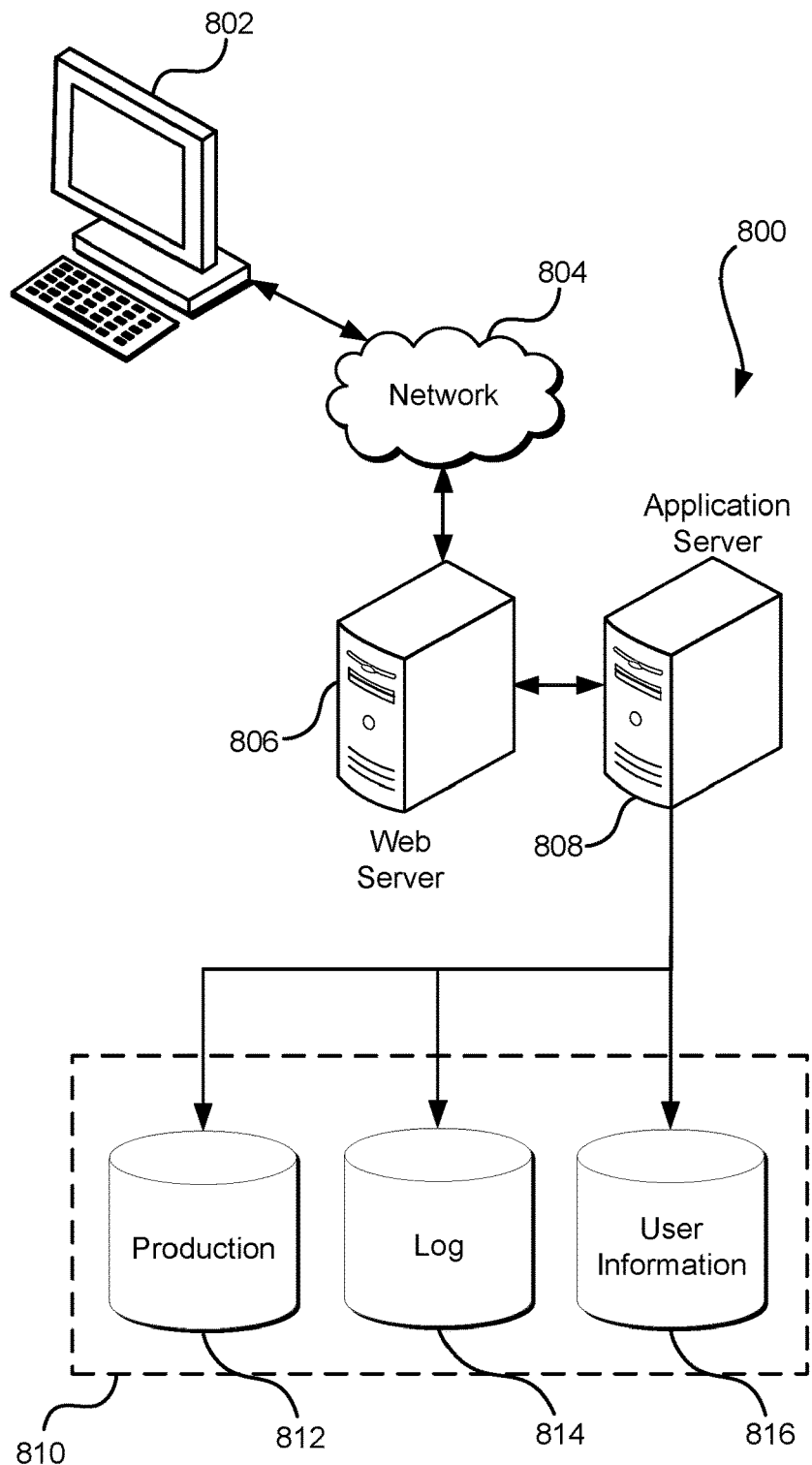
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   for a data storage request to be performed by a data storage service utilizing computing resources of the data storage service, determining a value for an amount of computing resources to be used by the data storage service to process the data storage request;
   removing the value from a first amount of operations allocated to a logical volume by the data storage service;
   determining a reduced value to remove from a second amount of operations allocated to the logical volume based at least in part on an amount of operations remaining in the first amount of operations after removing the value;
   removing the value from a total amount of operations representing a capacity of the computing resources to perform operations of the data storage service; and
   processing the data storage request.

2. The computer-implemented method of claim 1, wherein the computer-implemented method further comprises delaying processing of the data storage request as a result of determining there are insufficient operations in the first amount of operations to remove the value.

3. The computer-implemented method of claim 1, wherein the computer-implemented method further comprises determining the first amount of operations allocated to the logical volume based at least in part on an analysis of a workload associated with the logical volume.

4. The computer-implemented method of claim 1, wherein determining the reduced value further comprises increasing the second amount of operations allocated to a logical volume.

5. A system, comprising:
   one or more processors; and
   memory that includes instructions that, as a result of being executed by the one or more processors, cause the system to:
      determine a value representing an amount of computing resources to be utilized by the system to process a request to perform an operation on a logical volume;
      process the request by at least:
         removing the value from a first set of credited operations associated with the logical volume;
         determining a reduced value to remove from a second set of credited operations associated with the logical volume; and
         determining there are sufficient credited operations remaining in the first set of credited operations and the second set of credited operations after removing the value and reduced value; and
      remove the value from a third set of credited operations representing a total capacity of the system to process requests.

6. The system of claim 5, wherein the value represents a number of input/output (I/O) operations performed to process the request.

7. The system of claim 5, wherein the first set of credited operations further includes a set of tokens, where a token of the set of tokens represents an I/O operation.

8. The system of claim 5, wherein the second set of credited operations is determined based at least in part on a number of credited operations of the third set of credited operations.

9. The system of claim 5, wherein the second set of credited operations is determined based at least in part on a size of the logical volume.

10. The system of claim 5, wherein the second set of credited operations is determined based at least in part on a number of operations per interval of time requested by a customer associated with the logical volume.

11. The system of claim 5, wherein the second set of credited operations is determined based at least in part on a number of credited operations remaining in the first set of credited operations after removing the value from the first set of credited operations.

12. The system of claim 5, wherein the reduced value is determined based at least in part on a percentage of the total capacity of the system to process the request.

13. A non-transitory computer-readable storage medium having stored thereon executable instructions that, as a result of being executed by one or more processors of a computer system, cause the computer system to at least:
- determine a value representing an amount of computing resources of the computer system to be utilized to process a work request associated with a storage location;
- remove the value from a first amount of operations associated with computing resources, wherein the first amount of operations indicates a total amount of computing resources of the computer system currently available;
- remove the value from a second amount of operations associated with computing resources, wherein the second amount of operations indicates an amount of computing resources for processing work requests associated with the storage location;
- remove a reduced value from a third amount of operations associated with computing resources, wherein the third amount of operations indicates an increased amount of computing resources for processing work requests associated with the storage location over an interval of time; and
- process the work request.

14. The non-transitory computer-readable storage medium of claim 13, wherein the instructions that cause the computer system to remove the reduced value from the third amount of operations associated with computing resources further include instructions that cause the computer system to determine the reduced value based at least in part on a number of computing resources included in the third amount of operations associated with computing resources.

15. The non-transitory computer-readable storage medium of claim 13, wherein the instructions further comprise instructions that, as a result of being executed by the one or more processors, cause the computer system to delay processing of the work request.

16. The non-transitory computer-readable storage medium of claim 15, wherein the instructions that cause the computer system to delay processing of the work request further include instructions that cause the computer system to delay processing of the work request as a result of the second amount of operations associated with computing resources including insufficient capacity to process the work request after removing the value.

17. The non-transitory computer-readable storage medium of claim 15, wherein the instructions that cause the computer system to delay processing of the work request further include instructions that cause the computer system to delay processing of the work request as a result of the first amount of operations associated with computing resources including insufficient capacity to process the work request after removing the value.

18. The non-transitory computer-readable storage medium of claim 15, wherein the instructions further comprise instructions that, as a result of being executed by the one or more processors, cause the computer system to:
- after delaying the work request, determine insufficient capacity in the second amount of operations associated with computing resources to process the work request; and
- perform a secondary throttling mechanism on the work request.

19. The non-transitory computer-readable storage medium of claim 13, wherein the instructions further comprise instructions that, as a result of being executed by the one or more processors, cause the computer system to:
- determine insufficient capacity in the first amount of operations associated with computing resources to process the work request; and
- as a result, remove the value from the third amount of operations associated with computing resources.

20. The non-transitory computer-readable storage medium of claim 13, wherein the instructions further comprise instructions that, as a result of being executed by the one or more processors, cause the computer system to:
- determine insufficient capacity in the second amount of operations associated with computing resources to process the work request; and
- as a result, remove the value from the third amount of operations associated with computing resources.

* * * * *